(12) United States Patent
Ono et al.

(10) Patent No.: US 6,216,050 B1
(45) Date of Patent: Apr. 10, 2001

(54) ACTUATOR CONTROL APPARATUS AND MAGNETIC DISK UNIT

(75) Inventors: Hiroyuki Ono, Fujisawa; Tetsuo Ueda, Sagamihara, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/032,218

(22) Filed: Feb. 27, 1998

(30) Foreign Application Priority Data

Feb. 27, 1997 (JP) .................................................. 9-044322

(51) Int. Cl.[7] ............................. G05B 11/01; G05B 13/04
(52) U.S. Cl. ................................. 700/72; 700/29; 700/45; 700/83; 360/77.16; 360/78.09
(58) Field of Search .................................. 700/72, 29, 45, 700/83; 360/77.16, 78.09, 78.04, 77.04; 369/54, 116

(56) References Cited

U.S. PATENT DOCUMENTS

| | | | |
|---|---|---|---|
| 5,325,247 | * | 6/1994 | Ehrlich et al. ..................... 360/78.09 |
| 5,377,096 | | 12/1994 | Ono ...................................... 364/176 |
| 5,404,252 | * | 4/1995 | Nagasawa et al. ................ 360/77.16 |
| 5,483,439 | * | 1/1996 | Ono et al. ............................... 700/29 |
| 5,510,939 | * | 4/1996 | Lewis ................................. 360/78.09 |
| 5,675,450 | * | 10/1997 | Kadlec ................................ 360/78.09 |
| 5,818,655 | * | 10/1998 | Satoh et al. ............................. 360/65 |
| 5,949,608 | * | 9/1999 | Hunter ................................ 360/78.09 |
| 6,014,285 | * | 1/2000 | Okamura ............................ 360/78.04 |
| 6,023,383 | * | 2/2000 | Glover et al. ........................... 360/46 |

FOREIGN PATENT DOCUMENTS

| | | | |
|---|---|---|---|
| 5-166312 | | 7/1993 | (JP) ................................. G11B/21/10 |
| 406096546 | * | 4/1994 | (JP) ......................................... 21/10 |

* cited by examiner

*Primary Examiner*—Ayaz Sheikh
*Assistant Examiner*—Frantz B. Jean
(74) *Attorney, Agent, or Firm*—Monica D. Lee; Abdy Raissinia (57) ABSTRACT

An actuator control system and a magnetic disk device having a hybrid control system. The actuator control system includes an LPF that can be processed by the hardware architecture of a HDD that does not include a state estimator. The actuator control system includes an actuator 10, a VCM driver circuit 11 for driving the actuator 10, an ADC 12 for converting the position signal from the actuator 10 into a digital position signal, an MPU 13 for generating the control signal to the actuator 10 in response to the digital position signal, a DAC 14 for converting the control signal into an analog control signal, and an LPF 15 coupled between DAC 14 and VCM driver circuit 11. The MPU 13 compensates the phase delay resulting from the LPF 15 by digital control. Additionally, the digital control reconstructs the state model of a plant including the LPF 15 to a state model requiring no state estimator.

12 Claims, 2 Drawing Sheets

ACTUATOR CONTROL APPARATUS AND MAGNETIC DISK UNIT

BACKGROUND OF THE INVENTION

1. Field of the Invention

The present invention is related to an actuator control system of a magnetic storage device, and specifically to an actuator control system that reduces the effects of aliasing inherent in the digital control.

2. Description of Related Art

The performance of an actuator control of a magnetic storage device, such as a hard disk drive (HDD), may be degraded by the aliasing caused by the mechanical resonances of a head suspension. In particular, the mechanical resonances resulting from the head gimbal assembly (HGA) and the actuator may reduce the robustness of a HDD, and furthermore raise the acoustic noise during a high-speed seek operation of a HDD.

One conventional approach to address the effects of such mechanical resonances is presented in the Japan Published Unexamined Patent Application No. 5-166312. According to this publication, a low pass filter (LPF) having a low pole is placed immediately after a digital-to-analog converter (DAC) to reduce the gain in the high frequency region where the resonance is located. Because the LPF also affects characteristics in the low frequency region, the effect of the LPF in the low frequency region is digitally compensated. This actuator control system is often referred to as a hybrid system because it incorporates a combination of analog and digital circuits.

Although the hybrid actuator control system described above has many desirable characteristics, it was designed based on the presumption that the HDD includes hardware with a processor having relatively high arithmetic processing power.

More specifically, this conventional approach was designed to operate with a state estimator to meet the high arithmetic processing power of the DSP. Unfortunately, such a high performance processor often increases the overall cost of a HDD. As a result, many currently available HDDs do not include such a processor; therefore, this conventional hybrid actuator control system approach may not be suitable for many HDDs available today. Accordingly, it is often desirable to simplify the algorithm to the extent that it can be processed by an ordinary microprocessor (MPU) (i.e., a processor without a state estimator) while taking advantage of the desirable characteristics of the hybrid control system.

SUMMARY OF THE INVENTION

It is an object of the present invention to provide an actuator control system and a magnetic disk device that includes a the hybrid control system with a low pass filter (LPF).

It is also an object of the present invention to provide a hybrid actuator control system having a LPF that can be processed without a state estimator.

The present invention describes an actuator control system that responds to the position signal from an actuator. The actuator is driven by a control signal which is generated by a driver circuit. The actuator control system includes a LPF coupled between a digital-to-analog converter (DAC) for converting the digital control signal into an analog control signal and the driver circuit. Furthermore, the actuator control system includes a digital control device for compensating the phase delay caused by the LPF by digital control.

The digital control device reconstructs the state model of a plant including the LPF to a state model using only directly observable state variables. This may be accomplished without requiring a state estimator. Furthermore, the digital control device collectively compensates for the phase delay due to the LPF as part of the plant when designing the feedback system.

The present invention also describes an actuator control system that responds to the position signal from an actuator. The actuator is driven by a control signal which is generated by a driver circuit. The actuator control system includes a LPF coupled between a DAC for converting the digital control signal into an analog control signal and the driver circuit. The actuator control system also includes a digital control device for compensating the phase delay caused by the LPF by digital control. The digital control device is designed to operate with a state equation of a system having a LPF converted into a controllable canonical form as shown by Equations (9) and (10). This conversion enables all state variables to be directly measured.

$$\begin{bmatrix} x(i) \\ v(i) \\ x(i-2) \\ u(i-1) \\ u(i-2) \\ u(i-3) \\ w(i) \end{bmatrix} = \begin{bmatrix} 1-a_3 & 1+2a_3 & a_3 & p_2 & p_3 & p_4 & 0 \\ -a_3 & 1+2a_3 & a_3 & p_2 & p_3 & p_4 & 0 \\ 1 & -1 & 0 & 0 & 0 & 0 & 0 \\ 0 & 0 & 0 & 0 & 0 & 0 & 0 \\ 0 & 0 & 0 & 1 & 0 & 0 & 0 \\ 0 & 0 & 0 & 0 & 1 & 0 & 0 \\ 1 & 0 & 0 & 0 & 0 & 0 & 1 \end{bmatrix} \times \begin{bmatrix} x(i-1) \\ v(i-1) \\ x(i-3) \\ u(i-2) \\ u(i-3) \\ u(i-4) \\ w(i-1) \end{bmatrix} + \begin{bmatrix} p_1 \\ p_1 \\ 0 \\ 1 \\ 0 \\ 0 \\ 0 \end{bmatrix} u(i-1) \quad \text{Equation (9)}$$

$$y(i) = [1\ 0\ 0\ 0\ 0\ 0\ 0] \begin{bmatrix} x(i) \\ v(i) \\ x(i-2) \\ u(i-1) \\ u(i-2) \\ u(i-3) \\ w(i) \end{bmatrix} \quad \text{Equation (10)}$$

where x(I): control output x(I-1), x(I-2), x(I-3): previous values of x(I)

u(I): control input u(I-1), u(I-2), u(I-3): previous values of u(I)

v(I): state variable of quasi speed term w(I): integral term of output y(I): output of ADC.

One aspect of the present invention includes a digital control device that is adapted to control a system having a LPF based on the state feedback shown by Equation (11).

$$u(i) = [f_1 \; f_2 \; f_3 \; f_4 \; f_5 \; f_6 \; f_7] \begin{bmatrix} x(i) \\ v(i) \\ x(i-2) \\ u(i-1) \\ u(i-2) \\ u(i-3) \\ w(i) \end{bmatrix} \quad \text{Equation (11)}$$

where $f_1, f_2, f_3, f_4, f_5, f_6, f_7$: parameters, and x(I): control output x(I-2): previous value of x(I)

u(I): control input u(I-1), u(I-2), u(I-3): previous values of u(I)

v(I): state variable of quasi speed term w(I): integral term of output.

Another aspect of the present invention includes a digital control device designed with the state equation of a system having a LPF by being converted into a controllable canonical form of a speed system shown by Equations (12) and (13).

$$\begin{bmatrix} v(i) \\ v(i-1) \\ u(i-1) \\ u(i-2) \\ u(i-3) \\ w_v(i) \end{bmatrix} = \begin{bmatrix} 1+a_3 & -a_3 & p_2 & p_3 & p_4 & 0 \\ 1 & 0 & 0 & 0 & 0 & 0 \\ 0 & 0 & 0 & 0 & 0 & 0 \\ 0 & 0 & 1 & 0 & 0 & 0 \\ 0 & 0 & 0 & 1 & 0 & 0 \\ 1 & 0 & 0 & 0 & 0 & 1 \end{bmatrix} \times \begin{bmatrix} v(i-1) \\ v(i-2) \\ u(i-2) \\ u(i-3) \\ u(i-4) \\ w_v(i-1) \end{bmatrix} + \begin{bmatrix} p_1 \\ 0 \\ 1 \\ 0 \\ 0 \\ 0 \end{bmatrix} u(i-1) \quad \text{Equation (12)}$$

$$y_v(i) = [1 \; 0 \; 0 \; 0 \; 0 \; 0] \begin{bmatrix} v(i) \\ v(i-1) \\ u(i-1) \\ u(i-2) \\ u(i-3) \\ w_v(i) \end{bmatrix} \quad \text{Equation (13)}$$

where v(I): control speed u(I): control input u(I-1), u(I-2), u(I-3): previous values of u(I)

$y_v$(I): quasi speed $w_v$(I): integral of $y_v$(I)

An additional aspect of the present invention includes a digital control device that provides a transfer function matrix G from the state equation of a system including the low pass filter by a calculation based on Equation (4).

$$G = C(zI - A)^{-1} B \quad \text{Equation (4)}$$

$$= \frac{p_1 z^{-1} + p_2 z^{-2} + p_3 z^{-3} + p_4 z^{-4}}{1 - (2 + a_3) z^{-1} + (1 + 2a_3) z^{-2} - a_3 z^{-3}}$$

where $p_1, p_2, p_3$, and $p_4$ respectively are:

$p_1 = b_{11}$ $p_2 = a_1 b_{31} + b_{12} + b_{21} - a_3 b_{11} - b_{11}$ $p_3 = ab_{11} - b_{12} - ap_3 b_{12} - a_3 b_{21} + b_{22} - a_1 b_{31} + a_2 b_{31} + a_1 b_{32}$ $p_4 = a_3 b_{12} - a_3 b_{32} + a_2 b_{32}$ where G: transfer function matrix I: unit matrix A, B: constants.

The transfer function of Equation (4) is reconstructed to a discrete state equation based on the input u, output y, and delay values of them to obtain the controllable canonical form shown by Equations (5) and (6). A control system is designed based on the controllable canonical form represented by expressions (5) and (6).

$$\begin{bmatrix} x(i) \\ x(i-1) \\ x(i-2) \\ u(i-1) \\ u(i-2) \\ u(i-3) \end{bmatrix} = \begin{bmatrix} 2+a_3 & -(1+2a_3) & a_3 & p_2 & p_3 & p_4 \\ 1 & 0 & 0 & 0 & 0 & 0 \\ 0 & 1 & 0 & 0 & 0 & 0 \\ 0 & 0 & 0 & 0 & 0 & 0 \\ 0 & 0 & 0 & 1 & 0 & 0 \\ 0 & 0 & 0 & 0 & 1 & 0 \end{bmatrix} \times \begin{bmatrix} x(i-1) \\ x(i-2) \\ x(i-3) \\ u(i-2) \\ u(i-3) \\ u(i-4) \end{bmatrix} + \begin{bmatrix} p_1 \\ 0 \\ 0 \\ 1 \\ 0 \\ 0 \end{bmatrix} u(i-1) \quad \text{Equation (5)}$$

$$y(i) = [1 \; 0 \; 0 \; 0 \; 0 \; 0] \begin{bmatrix} x(i) \\ x(i-1) \\ x(i-2) \\ u(i-1) \\ u(i-2) \\ u(i-3) \end{bmatrix} \quad \text{Equation (6)}$$

where x(I): control output x(I-1), x(I-2), x(I-3): previous values of x(I)

u(I): control input u(I-1), u(I-2), u(I-3), u(I-4): previous values of u(I)

A further aspect of the present invention includes a digital control device that provides an output differential which is referred to as a quasi speed term. This term is introduced into a controllable canonical form as state variable v(I). The control system is designed based on the controllable canonical form into which the state variable v(I) is introduced according to Equation (7).

$$v(I) = x(I) - x(I-1) \quad \text{Equation (7)}$$

where x(I) is a control output, and x(I-1) is a previous value of it

The above digital control device may be the one in which the integral term of the output is further introduced into the controllable canonical form as a state variable w(I). The control system is designed based on the controllable canonical form into which the state variable w(I) according to Equation (8).

$$w(I) = w(I-1) + x(I-1) \quad \text{Equation (8)}$$

where w(I-1) is a previous value of the state variable w(I) and x(I-1) is a previous value of the control output x(I).

Other objects, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which:

FIG. 3 is a graph showing the frequency characteristics in which loss caused by the insertion of the LPF in the low frequency region has been digitally compensated for.

DETAILED DESCRIPTION

The actuator control system of the present invention may be used with the head position control system of a hard disk drive (HDD) or the like.

Figure 1:
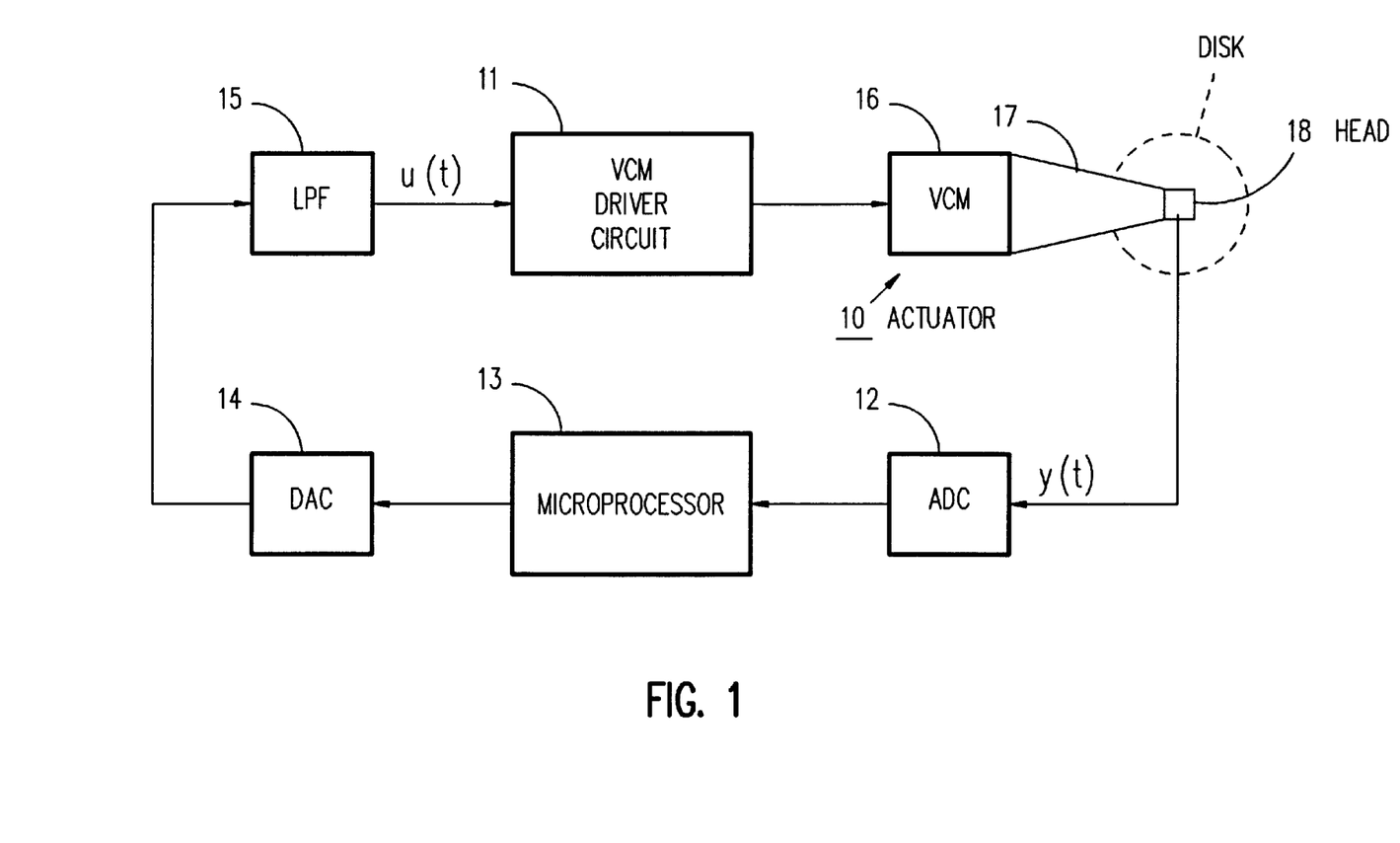
FIG. 1 illustrates a block diagram of an actuator control system for a magnetic storage system according to one embodiment of the present invention.

FIG. 1 illustrates an actuator control system according to one embodiment of the present invention. In FIG. 1, the actuator control system includes an actuator 10 with a head suspension mechanism 17 and a d.c. motor for moving the head (e.g. a voice coil motor (VCM) 16). A VCM driver circuit 11 drives VCM 16 of actuator 10. The head suspension mechanism 17 rotates around a pivot (not shown). An analog-to-digital converter (ADC) 12 converts a position signal y (t) provided by actuator 10 to a digital position signal. The position signal y(t) represents the position of head 18. A microprocessor (MPU) 13, which is responsive to the digital position signal, generates a control signal for moving the head to a desired position based on a state feedback shown by Equation 11 to be described later. For alternative embodiments, it is not required that the digital control device is implemented with a mircroprocessor. A digital-to-analog converter (DAC) 14 converts the digital control signal from MPU 13 to an analog control signal u(t). An analog low pass filter (LPF) 15 is coupled between DAC 14 and VCM driver circuit 11.

The LPF 15 which is positioned between DAC 14 and VCM driver circuit 11 is a first order analog LPF with a low pole. The analog LPF 15 reduces the gain of the high-frequency band in which mechanical resonance exists. For alternative embodiments, LPF 15 may be a digital LPF. The frequency characteristics of LPF 15 are described later in accordance with FIG. 2.

The MPU 13 generates a control signal for moving the head to a desired position in accordance with Equation (11) described later. The control system represented by Equation (11) compensates, by digital control, for the phase delay in a band ower than the Nyquist frequency fN, resulting from the analog LPF 15. The control system of the present invention is a simplified control system for providing digital control without requiring a state estimator. Thus, the actuator control system of the present invention may be processed by the hardware architecture in many HDDs available today.

The operation of the actuator control system is described below. The analog LPF 15 causes a phase delay in a band lower than the Nyquist frequency fN. The actuator control system of the present invention compensates this phase delay by digital control.

Figure 2:
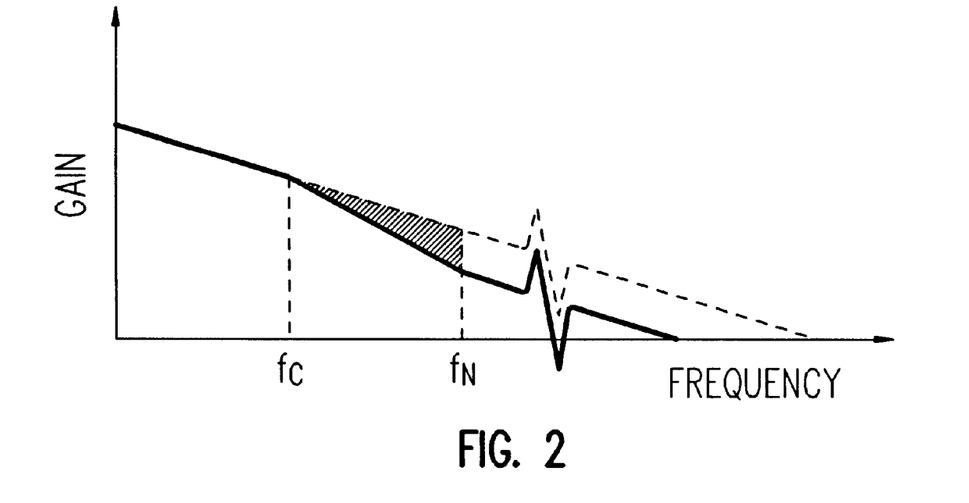
FIG. 2 is a graph showing the frequency characteristics in the case where a low-pass filter (LPF) with a cutoff frequency $f_c$ is inserted.
Figure 3:
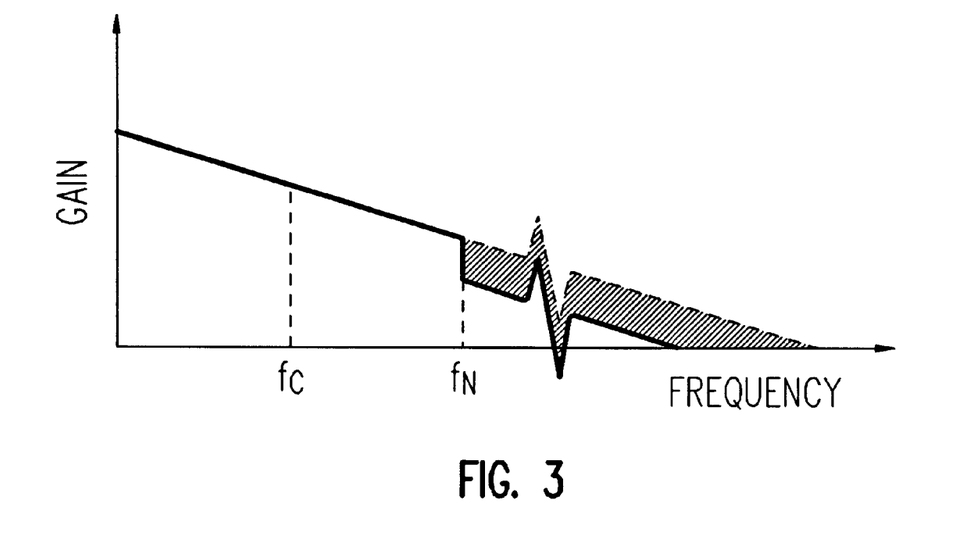

FIG. 2 shows the frequency characteristics of an actuator control system before the phase delay in a band lower than the Nyquist frequency fN is compensated by digital control. FIG. 3 shows the frequency characteristics of the actuator control system after such phase delay has been compensated. In these figures, the ordinate represents the gain and the abscissa represents the frequency.

The dotted line in FIG. 2 represents the frequency characteristics of a controlled system that includes actuator 10. Furthermore, a peak in the frequency characteristics due to mechanical resonance occurs in a high-frequency region above the Nyquist frequency fN.

The LPF 15 provides an attenuation characteristic in which a predetermined amount of attenuation occurs in a frequency region higher than the cutoff frequency fc, as shown by the solid line in FIG. 2. This causes the peak of the frequency characteristics caused by mechanical resonance, which occurs in a high-frequency region above the Nyquist frequency fN, to be attenuated.

Additionally, the LPF 15 enables the loss (phase delay) occurring in a low-frequency region (i.e., the region between the cutoff frequency fc and the Nyquist frequency fN) to be compensated by digital control. The hatched region shown in FIG. 2 illustrates the attenuated portion in the low-frequency region. Thus, the region between the cut-off frequency fc and the Nyquist frequency fN displays characteristics similar to that of a control system that does not include a LPF. As a result of digitally controlling the region lower than the Nyquist frequency fN, the frequency characteristics of the region lower than the Nyquist frequency fN can be digitally compensated. Thus, only the high-frequency region, which includes the peak of the frequency characteristics caused by mechanical resonances, is largely attenuated. FIG. 3 shows the frequency characteristics after the compensation by digital control. The hatched portion in FIG. 3 represents the attenuated portion.

The present invention describes a design technique used to compensate the phase delay in the region lower than the Nyquist frequency fN resulting from the LPF 15. The design technique of the present invention implements digital control with a simplified control system which can be processed without a state estimator. As mentioned above, many HDDs currently available today do not have a state estimator.

As mentioned above, actuator 10 of the HDD includes the current driven VCM 16 and arm 17 which supports the movement of magnetic head 18. The drive current of VCM 16 is usually proportional to the output value provided by MPU 13 through DAC 14. Accordingly, the control input received by actuator 10 represents acceleration information and the control output provided by actuator 10 represents position information. The basic system is referred to as a quadratic integral system.

If the first order LPF 15 is placed on the output side of DAC 14, the transfer function g(s) of the object to be controlled, including the first order LPF 15, becomes a three order system as shown by Equation (1).

$$g(s) = y(s)/u(s) = \frac{b}{s^2(s+a)} \quad \text{Equation (1)}$$

In Equation (1), u is the output of DAC 14, which represents the control input. Further, y is a position error signal (PES), which represents the control output. Note that "a" represents the pole of LPF 15, "b" represents the d.c. gain of the system, and "s" represents a Laplace operator.

Equations (2) and (3) represent a discrete version of Equation (1) having a sampling interval T and a calculation time delay $$x(I+1)=Ax(I)+Bu(I) \quad \text{Equation (2)}$$

$$y(I)=Cx(I) \quad \text{Equation (3)}$$

where $$x(i) = \begin{bmatrix} x(i) \\ dx(i)/dt \\ d^2x(i)/dt^2 \end{bmatrix}$$

$$u(i) = \begin{bmatrix} u(i) \\ u(i-1) \end{bmatrix}$$

$$A = \begin{bmatrix} 1 & T & a_1 \\ 0 & 1 & a_2 \\ 0 & 0 & a_3 \end{bmatrix}$$

$$B = \begin{bmatrix} b_{11} & b_{21} \\ b_{21} & b_{22} \\ b_{31} & b_{32} \end{bmatrix}$$

$$C = [1\ 0\ 0]$$

A conventional control system based on Equations (2) and (3) is described in the Japan Publication of Unexamined Patent Application No. 5-166312 previously mentioned. In this control system, a gain parameter for collectively compensating the LPF and the quadric integral system, which is the primary system, is obtained by a publicly known optimum control theory (for instance, the LQ method), such that the natural frequency characteristics are obtained for both the closed and open loops.

Of the state variables x(I), dx(I)/dt, and d2x(I)/dt2 which represent the position, speed, and acceleration of the head, respectively, only x(I) can be directly observed, and thus the remaining dx(I)/dt and d2x(I)/dt2 are estimated using a state estimator. By using a Kalman filter as the state estimator and appropriately using the current type and the prediction type depending on the case, a stable operation could be continued with no effect on the behavior of the whole control system even if the PES for one sample was dropped because of some failure. However, since the use of the state estimator is based on the presumption that a microprocessor or DSP having a high arithmetic processing power is used as hardware, the processing speed of the microprocessor (MPU) of many current HDD is not sufficient.

Accordingly, it is desirable to simplify the algorithm to the extent that it can be processed by a microprocessor (MPU) having less processing power such as one without a state estimator.

For the present invention, the realization of the system shown by the above Equations (2) and (3) is designed after converting them to a controllable canonical form. This realization allows all state variables to be directly measured. As a result, the state estimator can be eliminated. Furthermore, since the closed loop is designed to collectively compensate the LPF and the original second order system, natural characteristics are easily obtained. The LQ method can also be applied to the actuator control system of the present invention. However, since there is no state estimator, the precision of the interpolation for dropped samples decreases.

The transfer function matrix G of the system shown by the above Equations (2) and (3) is determined. Then, if I is a unit matrix of an appropriate dimension, the transfer function matrix G is represented by Equation (4).

$$G = C(zI - A)^{-1}B \qquad \text{Equation (4)}$$

-continued $$= \frac{p_1 z^{-1} + p_2 z^{-2} + p_3 z^{-3} + p_4 z^{-4}}{1 - (2 + a_3)z^{-1} + (1 + 2a_3)z^{-2} - a_3 z^{-3}}$$

where $p_1$, $p_2$, $p_3$, and $p_4$ respectively are:

$p_1 = b_{11}$ $p_2 = a_1 b_{31} + b_{12} + b_{21} a_{311} - b_{11}$ $p_3 = a_3 b_{11} - b_{12} - a_3 b_{12} - a_3 b_{21} + b_{22} - a_1 b_{31} + a_2 b_{31} + a_1 b_{32}$ $p_4 = a_3 b_{12} - a_3 b_{22} - a_1 b_{32} + a_2 b_{32}$

Equations (5) and (6) represent the transfer function of Equation (4) converted into discrete state equations based on the input u, output y, and their respective delay values. Equations (5) and (6) may be achieved by employing a controllable canonical form.

$$\begin{bmatrix} x(i) \\ x(i-1) \\ x(i-2) \\ u(i-1) \\ u(i-2) \\ u(i-3) \end{bmatrix} = \begin{bmatrix} 2+a_3 & -(1+2a_3) & a_3 & p_2 & p_3 & p_4 \\ 1 & 0 & 0 & 0 & 0 & 0 \\ 0 & 1 & 0 & 0 & 0 & 0 \\ 0 & 0 & 0 & 0 & 0 & 0 \\ 0 & 0 & 0 & 1 & 0 & 0 \\ 0 & 0 & 0 & 0 & 1 & 0 \end{bmatrix} \times \qquad \text{Equation (5)}$$

$$\begin{bmatrix} x(i-1) \\ x(i-2) \\ x(i-3) \\ u(i-2) \\ u(i-3) \\ u(i-4) \end{bmatrix} + \begin{bmatrix} p_1 \\ 0 \\ 0 \\ 1 \\ 0 \\ 0 \end{bmatrix} u(i-1)$$

$$y(i) = [1\ 0\ 0\ 0\ 0\ 0] \begin{bmatrix} x(i) \\ x(i-1) \\ x(i-2) \\ u(i-1) \\ u(i-2) \\ u(i-3) \end{bmatrix} \qquad \text{Equation (6)}$$

In the above Equations (5) and (6), x(I) is a control output, x(I-1) is the previous value immediately before it, and x(I-2) and x(I-3) are the second and third previous values of it, respectively. Further, u(I) is a control input, u(I-1) is the previous value immediately before it, and u(I-2) and u(I-3) are the second and third previous values of it, respectively.

Note that all factors other than x(I) and u(I) can be represented by the previous values of both the control output x(I) and control input u(I), or by values which can be directly observed (they may be saved in a memory).

It is often more convenient if the output differential, namely, the quasi speed term v(I), positively appears as a state variable. The quasi speed term v(I) is defined in Equation 7. Furthermore, if the integral term w(I) of the output is introduced as a state variable according to Equation (8), the system can be expressed by seven orders as shown by Equations (9) and (10). The HDD often has noise due to the effect of flexible tension or wind, and thus the error does not converge to zero only with the feedback shown by the Equations (5) and (6). To achieve such convergence, it is needed to introduce the integral term w(I) for integrating the error between the actual position and the target position, and enable the above error convergence by the integral term w(I).

$$v(I) = x(I) - x(I-1) \qquad \text{Equation (7)}$$

where x(I) is a control output, and x(I-1) is a previous value of it.

$$w(I)=w(I-1)+x(I-1) \quad \text{Equation (8)}$$

where w(I-1) is a previous value of the state variable w(I), and x(I-1) is a previous value of the control output x(I).

$$\begin{bmatrix} x(i) \\ v(i) \\ x(i-2) \\ u(i-1) \\ u(i-2) \\ u(i-3) \\ w(i) \end{bmatrix} = \begin{bmatrix} 1-a_3 & 1+2a_3 & a_3 & p_2 & p_3 & p_4 & 0 \\ -a_3 & 1+2a_3 & a_3 & p_2 & p_3 & p_4 & 0 \\ 1 & -1 & 0 & 0 & 0 & 0 & 0 \\ 0 & 0 & 0 & 0 & 0 & 0 & 0 \\ 0 & 0 & 0 & 1 & 0 & 0 & 0 \\ 0 & 0 & 0 & 0 & 1 & 0 & 0 \\ 1 & 0 & 0 & 0 & 0 & 0 & 1 \end{bmatrix} \times \quad \text{Equation (9)}$$

$$\begin{bmatrix} x(i-1) \\ v(i-1) \\ x(i-3) \\ u(i-2) \\ u(i-3) \\ u(i-4) \\ w(i-1) \end{bmatrix} + \begin{bmatrix} p_1 \\ p_1 \\ 0 \\ 1 \\ 0 \\ 0 \\ 0 \end{bmatrix} u(i-1)$$

$$y(i) = [1\ 0\ 0\ 0\ 0\ 0\ 0] \begin{bmatrix} x(i) \\ v(i) \\ x(i-2) \\ u(i-1) \\ u(i-2) \\ u(i-3) \\ w(i) \end{bmatrix} \quad \text{Equation (10)}$$

The state feedback shown by Equation (11) is constructed from Equations (9) and (10). More specifically, the system represented by Equations (9) and (10) may be used as a model to determine (i.e., by experiment) parameters f1 to f7 of the Equation (11) so as to optimize the feedback. The MPU 13 performs a seven-order calculation based on the Equation (11) to carry out the actuator control including the above described digital compensation.

$$u(i) = [f_1\ f_2\ f_3\ f_4\ f_5\ f_6\ f_7] \begin{bmatrix} x(i) \\ v(i) \\ x(i-2) \\ u(i-1) \\ u(i-2) \\ u(i-3) \\ w(i) \end{bmatrix} \quad \text{Equation (11)}$$

The conventional discrete system using no LPF includes an integrator, and may be represented by five orders. Accordingly, the control system of the present embodiment increases from five orders to seven orders, and thus the increase in the sum of products in the state feedback is two sets at most.

The system of the Equations (9) and (10) represents a position system, and it is used for the control system design of settling and track following. On the other hand, a speed system is usually used for controlling a seek operation. If the integral term is excluded from Equations (9) and (10) and x(I) is considered to be the integral of v(I), an identical setting is also available from Equations (9) and (10). For reference, Equations (12) and (13) represents a speed system.

$$\begin{bmatrix} v(i) \\ v(i-1) \\ u(i-1) \\ u(i-2) \\ u(i-3) \\ w_v(i) \end{bmatrix} = \begin{bmatrix} 1+a_3 & -a_3 & p_2 & p_3 & p_4 & 0 \\ 1 & 0 & 0 & 0 & 0 & 0 \\ 0 & 0 & 0 & 0 & 0 & 0 \\ 0 & 0 & 1 & 0 & 0 & 0 \\ 0 & 0 & 0 & 1 & 0 & 0 \\ 1 & 0 & 0 & 0 & 0 & 1 \end{bmatrix} \times \quad \text{Equation (12)}$$

$$\begin{bmatrix} v(i-1) \\ v(i-2) \\ u(i-2) \\ u(i-3) \\ u(i-4) \\ w_v(i-1) \end{bmatrix} + \begin{bmatrix} p_1 \\ 0 \\ 1 \\ 0 \\ 0 \\ 0 \end{bmatrix} u(i-1)$$

$$y_v(i) = [1\ 0\ 0\ 0\ 0\ 0] \begin{bmatrix} v(i) \\ v(i-1) \\ u(i-1) \\ u(i-2) \\ u(i-3) \\ w_v(i) \end{bmatrix} \quad \text{Equation (13)}$$

where $y_v(I)$ and $w_v(I)$ are a quasi speed and the integration thereof, respectively.

As described above, the actuator control apparatus related to the present embodiment comprises actuator 10, VCM driver circuit 11 for driving the actuator 10, ADC 12 for converting the position signal from the actuator 10 to a digital position signal, MPU 13 for generating a control signal to for actuator 10 in response to the digital position signal, DAC 14 for converting the digital control signal to an analog control signal, and LPF 15 coupled between DAC 14 and VCM driver circuit 11. The MPU 13 compensates the phase delay resulting from LPF 15 by digital control. The digital control is implemented by a control system which is constructed so that the state model of a plant including LPF 15 is reconstructed to a state model using only directly observable state variables without requiring a state estimator. Thus, the phase delay due to the interposition of the LPF 15 is collectively compensated as part of the plant when designing the feedback system.

In the present embodiment, this control system is obtained by (1) designing it after converting the state equation of a system including LPF 15 into a controllable canonical form and (2) having MPU 13 generate a control signal for moving the head to a desired position according to the feedback control shown by Equation (11). Thus, the present embodiment can be expressed by a seven order state feedback as shown by Equation (11), and it can be implemented by a simplified control system processable by the hardware architecture of the many currently available HDDs without requiring a state estimator. Accordingly, since the digital control includes the type of microprocessor used in many currently available HDDs (i.e., without using a DSP), the actuator control apparatus of the hybrid control system which has excellent characteristics, can be implemented at low cost.

For one embodiment, the pole of the analog LPF 15 was placed at 1.6 kHz. The LPF 15 was implemented by changing the capacitor originally put in the VCM driver circuit 11 to that having a larger value. Accordingly, the addition of LPF 15 to the actuator control system did not require any increase in cost or substrate area.

An improvement in the gain equal to or larger than 5 dB was observed in a band higher than the Nyquist frequency.

As a result, the robustness for mechanical resonance was increased. Furthermore, the acoustic noise was also improved by 4 dB at 8 kHz for instance. Additionally, the seek time was not degraded.

Several advantages of the present invention are described below. The following advantages can be obtained without sacrificing the access speed in a HDD.

(1) The robustness in a band higher than the Nyquist frequency fN can be increased. That is, the increase of the robustness can be achieved in a simplified control system processable by the hardware architecture of the many currently available HDDS. Additionally, the reliability of the product increases and the yield in the process can be improved.

(2) The acoustic noise in the seek operation can be reduced.

(3) The damping parts attached to the HDD may be eliminated in order to reduce the cost.

Accordingly, if the actuator control apparatus having such excellent advantages is applied to the position control system of a HDD, then there is no reduction in the robustness of the HDD due to the respective mechanical resonance of the head gimbal assembly (HGA) and the actuator, and no acoustic noise resulting from the high-speed seek operation. Thus, since the microprocessor does not require a DSP, the actuator control system of the present invention may be implemented in many currently available HDDs without increasing the hardware costs.

Although the present embodiment, has been described with respect to a head position control system of a HDD, the hybrid control system of the present invention may be used in various other applications. For example, the apparatus may be used for the position control of an external storage device other than the HDD or any other control system. That is, the object to be controlled is not limited as long as it is a control system including the state feedback shown by the Equations (9), (10), and (11).

Furthermore, in addition to the method described in the present embodiment, there are other methods for achieving the actuator control apparatus related to the present embodiment without using a state estimator, as long as they are the ones in which the state model of a plant including a LPF is reconstructed to a state model requiring no state estimator.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. An actuator control apparatus for providing a control signal to an actuator driven by a driver circuit in response to a position signal from said actuator wherein said position signal is used to position a head coupled to said actuator, said actuator control apparatus comprising:

an analog-to-digital converter (ADC) for converting said position signal into a digital position signal;

a digital control device coupled to said ADC, said digital control device receiving said digital position signal and providing a digital control signal;

a digital-to-analog converter (DAC) coupled to said digital control device, said DAC converting said digital control signal into an analog control signal; and a low pass filter (LPF) coupled between said driver circuit and said DAC and receiving said analog control signal, wherein said digital control device reconstructs the state model of a plant which includes said LPF to a state model using only directly observable state variables and collectively compensates for the phase delay resulting from said LPF.

2. The actuator control apparatus of claim 1, wherein said digital control device is based on state Equations (9) and (10), $$\begin{bmatrix} x(i) \\ v(i) \\ x(i-2) \\ u(i-1) \\ u(i-2) \\ u(i-3) \\ w(i) \end{bmatrix} = \begin{bmatrix} 1-a_3 & 1+2a_3 & a_3 & p_2 & p_3 & p_4 & 0 \\ -a_3 & 1+2a_3 & a_3 & p_2 & p_3 & p_4 & 0 \\ 1 & -1 & 0 & 0 & 0 & 0 & 0 \\ 0 & 0 & 0 & 0 & 0 & 0 & 0 \\ 0 & 0 & 0 & 1 & 0 & 0 & 0 \\ 0 & 0 & 0 & 0 & 1 & 0 & 0 \\ 1 & 0 & 0 & 0 & 0 & 0 & 1 \end{bmatrix} \times$$

$$\begin{bmatrix} x(i-1) \\ v(i-1) \\ x(i-3) \\ u(i-2) \\ u(i-3) \\ u(i-4) \\ w(i-1) \end{bmatrix} + \begin{bmatrix} p_1 \\ p_1 \\ 0 \\ 1 \\ 0 \\ 0 \\ 0 \end{bmatrix} u(i-1)$$

Equation (9)

$$y(i) = [1\ 0\ 0\ 0\ 0\ 0\ 0] \begin{bmatrix} x(i) \\ v(i) \\ x(i-2) \\ u(i-1) \\ u(i-2) \\ u(i-3) \\ w(i) \end{bmatrix}$$

Equation (10)

where x(I): control output x(I-1), x(I-2), x(I-3): previous values of x(I)

u(I): control input u(I-1), u(I-2), u(I-3): previous values of u(I)

v(I): state variable of quasi speed term w(I): integral term of output y(I): output of ADC.

3. The actuator control apparatus of claim 2, wherein said digital control device provides feedback control based on the state feedback shown by Equation (11), $$u(i) = [f_1\ f_2\ f_3\ f_4\ f_5\ f_6\ f_7] \begin{bmatrix} x(i) \\ v(i) \\ x(i-2) \\ u(i-1) \\ u(i-2) \\ u(i-3) \\ w(i) \end{bmatrix}$$

Equation (11)

where $f_1$, $f_2$, $f_3$, $f_4$, $f_5$, $f_6$, $f_7$: parameters x(I): control output x(I-2): previous value of x(I)

u(I): control input u(I-1), u(I-2), u(I-3): previous values of u(I)

v(I): state variable of quasi speed term w(I): integral term of output.

4. The actuator control apparatus of claim 1, wherein said digital control device provides a speed system based on Equations (12) and (13), $$\begin{bmatrix} v(i) \\ v(i-1) \\ u(i-1) \\ u(i-2) \\ u(i-3) \\ w_v(i) \end{bmatrix} = \begin{bmatrix} 1+a_3 & -a_3 & p_2 & p_3 & p_4 & 0 \\ 1 & 0 & 0 & 0 & 0 & 0 \\ 0 & 0 & 0 & 0 & 0 & 0 \\ 0 & 0 & 1 & 0 & 0 & 0 \\ 0 & 0 & 0 & 1 & 0 & 0 \\ 1 & 0 & 0 & 0 & 0 & 1 \end{bmatrix} \times \begin{bmatrix} v(i-1) \\ v(i-2) \\ u(i-2) \\ u(i-3) \\ u(i-4) \\ w_v(i-1) \end{bmatrix} + \begin{bmatrix} p_1 \\ 0 \\ 1 \\ 0 \\ 0 \\ 0 \end{bmatrix} u(i-1) \quad \text{Equation (12)}$$

$$y_v(i) = [1\ 0\ 0\ 0\ 0\ 0] \begin{bmatrix} v(i) \\ v(i-1) \\ u(i-1) \\ u(i-2) \\ u(i-3) \\ w_v(i) \end{bmatrix} \quad \text{Equation (13)}$$

where v(I): control speed u(I): control input u(I-1), u(I-2), u(I-3): previous values of u(I)

$y_v$(I): quasi speed $w_v$(I): integral of $y_v$(I).

5. An actuator control apparatus of claim 1, wherein said digital control device provides a transfer function matrix G based on Equation (4), $$G = C(zI - A)^{-1}B \quad \text{Equation (4)}$$

$$= \frac{p_1 z^{-1} + p_2 z^{-2} + p_3 z^{-3} + p_4 z^{-4}}{1 - (2+a_3)z^{-1} + (1+2a_3)z^{-2} - a_3 z^{-3}}$$

where $p_1$, $p_2$, $p_3$ and $p_4$ respectively are:

$p_1 = b_{11}$ $p_2 = a_1 b_{31} + b_{12} + b_{21} - a_3 b_{11} - b_{11}$ $p_3 = a_3 b_{11} - b_{12} - a_3 b_{12} - a_3 b_{21} + b_{22} - a_1 b_{31} + a_2 b_{31} + a_1 b_{32}$ $p_4 = a_3 b_{12} - a_3 b_{22} - a_1 b_{32} + a_2 b_{32}$ where G: transfer function matrix I: unit matrix A, B: constants, wherein said digital control device reconstructs said transfer function of said equation (4) into a discrete state equation based on the input u, the output y, and their respective delay values, wherein said discrete state equation is represented by Equations (5) and (6), $$\begin{bmatrix} x(i) \\ x(i-1) \\ x(i-2) \\ u(i-1) \\ u(i-2) \\ u(i-3) \end{bmatrix} = \begin{bmatrix} 2+a_3 & -(1+2a_3) & a_3 & p_2 & p_3 & p_4 \\ 1 & 0 & 0 & 0 & 0 & 0 \\ 0 & 1 & 0 & 0 & 0 & 0 \\ 0 & 0 & 0 & 0 & 0 & 0 \\ 0 & 0 & 0 & 1 & 0 & 0 \\ 0 & 0 & 0 & 0 & 1 & 0 \end{bmatrix} \times \begin{bmatrix} x(i-1) \\ x(i-2) \\ x(i-3) \\ u(i-2) \\ u(i-3) \\ u(i-4) \end{bmatrix} + \begin{bmatrix} p_1 \\ 0 \\ 0 \\ 1 \\ 0 \\ 0 \end{bmatrix} u(i-1) \quad \text{Equation (5)}$$

$$y(i) = [1\ 0\ 0\ 0\ 0\ 0] \begin{bmatrix} x(i) \\ x(i-1) \\ x(i-2) \\ u(i-1) \\ u(i-2) \\ u(i-3) \end{bmatrix} \quad \text{Equation (6)}$$

where x(I): control output x(I-1), x(I-2), x(I-3): previous values of x(I)

u(I): control input u(I-1), u(I-2), u(I-3), u(I-4): previous values of u(I).

6. The actuator control apparatus of claim 1, wherein said digital control device provides a quasi speed term v(I) represented by Equation (7), $$v(I) = x(I) - x(I-1) \quad \text{Equation (7)}$$

where x(I) is a control output, and x(I-1) is a previous value of x(I).

7. The actuator control apparatus of claim 6, wherein said digital control device provides an integral term w(I) represented by Equation (8), $$w(I) = w(I-1) + x(I-1) \quad \text{Equation (8)}$$

where w(I-1) is a previous value of the state variable w(I), and x(I-1) is a previous value of the control output x(I).

8. The actuator control apparatus as set forth in claim 1, wherein said low pass filter includes a cut-off frequency set so as to fully attenuate the peak in a frequency region higher than the Nyquist frequency.

9. The actuator control apparatus as set forth in claim 1, wherein said low pass filter is an analog first order low pass filter which has a pole at a frequency lower than the Nyquist frequency.

10. The actuator control apparatus as set forth in claim 1, wherein said low pass filter is a digital low pass filter.

11. The actuator control apparatus of claim 1, wherein said digital control device is a microprocessor.

12. A magnetic disk device, comprising:

at least one disk for storing information;

at least one head for reading information from or writing information to at least one of said disks;

a suspension coupled to said head;

an actuator coupled to said suspension, said actuator providing an analog position signal;

an actuator control system including:

a driver circuit for driving said actuator;

an analog-to-digital converter (ADC) for converting said analog position signal from said actuator into a digital position signal;

a digital control device for providing a digital control signal to said actuator in response to said digital position signal;

a digital-to-analog converter (DAC) for converting said digital control signal into an analog control signal; and a low pass filter (LPF) coupled between said DAC and said driver circuit, wherein said digital control device reconstructs the state model of a plant including said LPF to a state model using only directly observable state variables and collectively compensates for the phase delay resulting from said LPF as part of said plant.

* * * * *